Patented Dec. 26, 1950

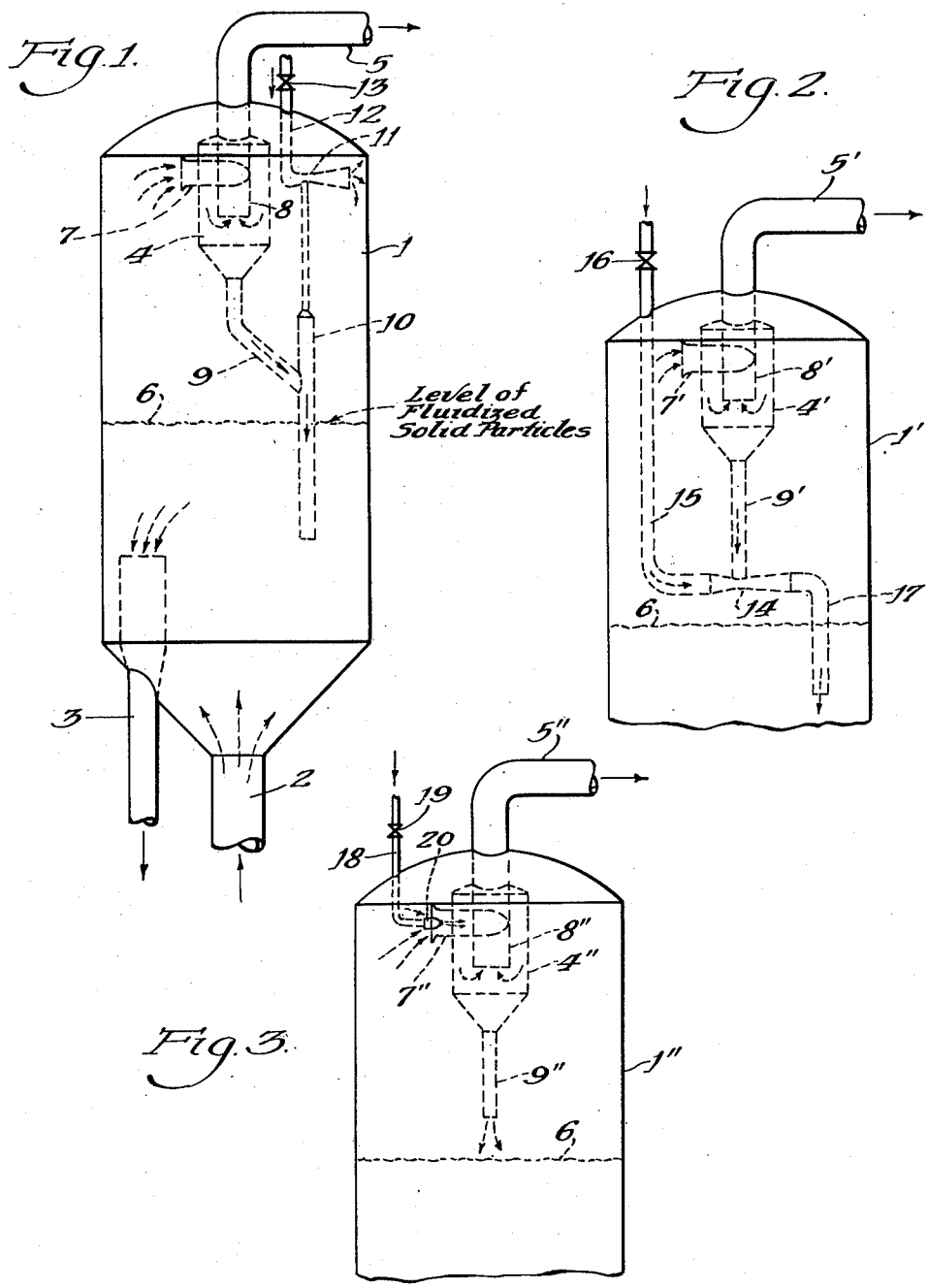

2,535,140

UNITED STATES PATENT OFFICE 2,535,140

CENTRIFUGAL SEPARATOR

Louis S. Kassel, Riverside, Ill., assignor to Universal Oil Products Company, Chicago, Ill., a corporation of Delaware Application September 13, 1946, Serial No. 696,790

2 Claims. (Cl. 183—83)

This invention relates to an improved method and apparatus for the separation of finely divided solid particles wherein the separating apparatus is of the centrifugal type which may be used in combination with a closed contact chamber, maintaining finely divided solid particles therein, and which employs a solid particle return line to transfer separated solid particles from the separator to the interior of the contacting chamber. More particularly, the improvement comprises connecting a conduit to the body of the centrifugal separating apparatus in such a manner as to have an auxiliary flow stream substantially prevent or eliminate any upward flow of gases through the solid particle return line and thereby increase the efficiency of the centrifugal separating apparatus.

The use of cyclone or centrifugal types of separating devices for the separation and collection of dust and finely divided solid particles is an old art. The general practice has always been to have the centrifugal separators discharge the collected particles, which have been gathered from the outgoing gases, into a pot or hopper from which they may be subsequently discarded or withdrawn and returned to the contacting chamber for reuse. In some contact processes, such as the fluidized catalyst conversion processes of the petroleum and chemical industries, the finely divided solid particles of catalyst which are employed are of considerable value and are retained in the system by the use of various types of separating devices. Outgoing gases or vaporous reaction products tend to carry the finely divided particles in entrainment, such that product streams must therefore be channeled through separating means. Centrifugal or cyclone types of separators are commonly used in connection with the fluidized catalytic conversion processes to prevent the solid materials from passing out with the waste gases and to maintain them within certain contact zones.

Normally there is an unavoidable pressure loss through a centrifugal or cyclone type of separating device such that the separated material must be transferred from a zone of lower pressure to a zone of higher pressure. In such cases, it has been the usual practice to maintain a column of separated solid particles in the return line from the cyclone separator hopper to the interior of the contacting zone, wherein the gas and solid material contact is taking place, such that a sufficient static head is obtained to overcome the differential pressures between the two zones. This static head overcomes the unfavorable pressure differential in regard to the solid particles, but does not do so for the gas, with the result that gas from the main contacting zone flows up the solid particle return line or "dip leg," as it is commonly called. The amount of this reverse gas flow is small in comparison with the main flow through the body of the separator; however, it enters the cyclone chamber near the critical heart of the vortex and seriously impairs the efficiency of this type of separator.

The improved method and apparatus of this invention substantially eliminate this reverse gas flow through the solid particle return line by employing an auxiliary flow stream in communication with the body of the centrifugal type of separator. In one form of apparatus and method of operation, a jet pump or ejector is used in an auxiliary conduit connected with the dip leg from the solid particle separator. The ejector and auxiliary flow stream passing through the conduit operate to withdraw any upwardly flowing gas from within the solid particle dip leg and subsequently discharge it to the interior of the contact chamber. In another embodiment of the invention, an injector, or other pressure type of discharging device, is connected with the body of the centrifugal separator in a manner to maintain an increased pressure within the separation zone and to thereby prevent any upward flow of gas through the solid particle return line, from the gas and solid particle contacting zone.

It is a principal object of this invention to eliminate any upward gas flow through the dip leg or solid particle return line from a centrifugal type of separating device where the separator operates in combination with a closed contact chamber and is mounted at the upper end of the latter.

It is another object of this invention to provide a more efficient centrifugal cyclone type separator by means of an auxiliary flow stream which alters and controls the normal gas flow and pressure drop through the separating device.

Suction fans, ejectors and the like have been previously used with separating devices by connecting them to the clean gas outlet such that an increased velocity is obtained through the separator. However, this type of usage does not eliminate the upward gas flow through the particle return line and conversely tends to aggravate this undesirable condition so that the efficiency of the centrifugal separator is substantially reduced from that which is obtainable. The auxiliary flow stream employed in this invention connects or communicates with the body of the centrifugal type separator, rather than the clean gas outlet, and operates in a manner which will substantially prevent any upward gas flow through the solid particle outlet line, whereas the previously mentioned method of connection merely increases the undesirable condition.

The accompanying drawing and the following description thereof will serve to more fully explain various forms of the improved apparatus and the improved method of operation for effecting the efficient separation of solid particles from gaseous flow streams.

Figure 1 of the drawing is a diagrammatic elevational view of a chamber suitable for contacting gaseous mediums and finely divided solid particles, with centrifugal type separation means shown at the gas outlet and an ejector positioned at the upper end of a standpipe which in turn connects with the solid particle return line or dip leg from the separator.

Figure 2 of the drawing is a partial elevational view of a contacting chamber and a centrifugal type separating device operating in connection therewith, with an ejector connecting directly to the solid particle return line or dip leg.

Figure 3 of the drawing shows still another partial elevational view of a contact chamber with a centrifugal separating device mounted at the gas outlet from the chamber and with an auxiliary flow stream or injector mounted in the inlet to the separator such that an increased pressure may be provided within the body of the separating device to substantially eliminate an upward flow of gases within the solid particle dip leg.

Referring now to Figure 1 of the drawing, the chamber 1 may be any closed contact chamber such as may be used in contacting fluidized finely divided solid particles with a gaseous or vapor stream. Gases and finely divided solid particles may be charged to the chamber by way of inlet 2 while used solid particles may be withdrawn through outlet 3 and gaseous or vaporous reaction products in turn withdrawn through separator 4 and the outlet line 5 at the upper end of the contact chamber 1. The separator 4 need not necessarily be mounted within the contact chamber 1, however, in gaseous and solid particle contact systems it has become common practice to maintain the separators within the contact chamber at a point above the dense fluidized phase which may be maintained in the lower portion of the contact chamber. In this drawing, the top level of the dense phase is indicated by the broken line 6, and the zone above this line comprises gaseous reaction products and a small amount of entrained solid material. The separator 4 has a tangential inlet 7, a clean gas outlet 8 which in turn connects with outlet line 5, and a solid particle return line 9 which serves to return the removed solid particles to the dense phase contact zone within the lower portion of chamber 1. In this form of the apparatus, a standpipe 10 is provided to connect with the return line 9. The standpipe 10 has positioned at its upper end an ejector 11, of the Venturi type, which in turn communicates with inlet line 12 having control valve 13. An inert fluid or gaseous medium such as steam, flue gas or the like, is passed through line 12 and the ejector 11 and thereby provides suction on the standpipe 10, such that any gases which pass upwardly through the lower end of standpipe 10 and which would normally enter the dip leg 9, may be withdrawn and discharged into the interior of the chamber 1 through the outlet end of the ejector 11. The flow through conduit 12 is capable of providing a jet pump action on the pipe 10, however the Venturi type ejector 11 provides a more efficient pump or suction action.

The flow through the conduit 12 and the suction or vacuum provided by ejector 11 should be maintained such that primarily gases only will be withdrawn from the standpipe 10 but with a minor amount of solid particles entrained therein. Of course, the auxiliary flow stream and the ejector 11 will necessarily provide a certain amount of suction on the dip leg 9; however, this will act to increase the efficiency of the centrifugal separator 4 and positively prevent any upward flow of gases thereto, through line 9, which as previously noted, would adversely affect the centrifugal action taking place in the body of the cyclone separator itself.

In Figure 2 of the drawing, a contact chamber 1' is shown which is similar to the chamber 1 of Figure 1. The chamber 1' has a centrifugal type of separator 4' positioned within the upper portion thereof. The separator 4' has a tangential inlet 7' for gaseous products and entrained solids, a clean gas outlet 8' which in turn connects with outlet line 5', and a solid particle return line 9'. In this form of the apparatus, an ejector 14 is positioned directly below the dip leg 9', with the latter connecting into the throat of the Venturi type of ejector 14. A conduit 15, having control valve 16, passes through the contact chamber 1' and connects with the ejector 14 such that a flow stream of an inert medium may be passed therethrough and cause a downward flow through discharge line 17 and at the same time provide suction on the solid particle return line 9'. This form of apparatus provides a somewhat more simple construction than that shown in Figure 1 and accomplishes the principal objective of preventing an upward gas flow through the solid particle return line while at the same time providing a positive means for withdrawing solid particles from the lower portion of the separator 4' and for effecting an increased separating efficiency in the latter.

Figure 3 of the drawing shows still another modification of the invention with a conduit extending into the inlet of a centrifugal type separator. The contact chamber 1'' has a centrifugal separator 4'' mounted within its upper portion with the latter serving to separate entrained, finely divided solid particles from the outgoing gas stream such that the particles may be retained within the contact zone of the chamber 1''. Here again the separator 4'' has a tangential inlet 7'', a clean gas outlet 8'', which connects with outlet line 5'', and a dip leg or solid particle return line 9''. A conduit 18 having a valve 19 is extended into the chamber 1'' and into inlet 7'' of the separator 4''. A flow stream of inert material such as steam, flue gas or the like, as previously noted, may thus be passed into the separator 4'' through an injector or discharge nozzle 20, the latter being provided at the end of conduit 18 and extending into the inlet 7''. The auxiliary gaseous discharge from the injector 20 and conduit 18, provides an increased pressure within the body of the centrifugal separator and thus overcomes the condition of having a lower pressure within this zone than is maintained within the lower portion of the contact chamber 1''. The increase in pressure within the separator 4'' in turn prevents any upward flow of gas through the solid particle return line 9", which as previously noted, adversely affects the efficiency of the centrifugal action within the body of the separator. The injector action of the auxiliary flow stream entering the cyclone separator 4" also tends to increase the velocity of the product gas and solid particle stream passing through the separator and provides an increased efficiency of separation therein.

It is not intended to limit this invention to the exact forms of centrifugal apparatus shown or to combining the auxiliary conduit and flow stream with a single stage of particle separation, for it is obvious that varying forms of apparatus and arrangement of parts may be employed. Also, as previously noted, the body of the separating device itself need not be mounted within the contact chamber as shown. With an exteriorly positioned separator, the general arrangement of the auxiliary conduit and flow stream with respect to the particle separator would be unchanged and will be substantially as shown and discussed with the solid particle return line and the ejector combination, as in Figures 1 and 2, discharging to the interior of the contact chamber. However, in the modification of Figure 3, the auxiliary conduit and flow stream may be permitted to enter the inlet line to the particle separator without passing through the wall of chamber 1".

I claim as my invention:

1. Apparatus of the type described comprising in combination a contact chamber, said chamber having inlet and outlet means and being arranged for contacting gases and finely divided solid particles, a centrifugal type separator at the gas outlet of said contact chamber, a solid particle return line passing from said separator to the interior of said contact chamber, a standpipe communicating at an intermediate point in the height thereof with the lower end of said solid particle return line, jet pumping means mounted across the upper end of said standpipe, a conduit connecting to said pumping means with the latter adapted to receive and pass a flow stream therethrough and operating to withdraw gas flowing upwardly through said solid particle return line while permitting gravity descent of solid particles through said return line and said standpipe to the interior from said contact chamber.

2. The apparatus of claim 1 further characterized in that said jet pumping means is a Venturi type of ejector.

LOUIS S. KASSEL.

REFERENCES CITED

The following references are of record in the file of this patent:

UNITED STATES PATENTS

| Number | Name | Date |
|---|---|---|
| 1,353,431 | Sims | Sept. 21, 1920 |
| 1,496,908 | Schutz | June 10, 1924 |
| 2,153,026 | Ringius | Apr. 4, 1939 |
| 2,214,658 | Browning | Sept. 10, 1940 |
| 2,289,970 | Rowand et al. | July 14, 1942 |
| 2,378,607 | Watts | June 18, 1945 |
| 2,414,641 | French | Jan. 21, 1947 |